(12) United States Patent
Dow et al.

(10) Patent No.: US 11,874,803 B2
(45) Date of Patent: Jan. 16, 2024

(54) SYSTEM AND METHOD FOR IDENTIFYING, INVENTORYING, MANAGING, AND MONETIZING WATER ASSETS

(71) Applicant: WETx, Inc., Salt Lake City, UT (US)

(72) Inventors: Tyler Dow, Midway, UT (US); Eric Vogeler, Salt Lake City, UT (US); Jesse Empey, Saratoga Springs, UT (US)

(73) Assignee: Wetx Inc., Salt Lake City, UT (US)

( * ) Notice: Subject to any disclaimer, the term of this patent is extended or adjusted under 35 U.S.C. 154(b) by 41 days.

(21) Appl. No.: 17/519,432

(22) Filed: Nov. 4, 2021

(65) Prior Publication Data
US 2022/0138162 A1 May 5, 2022

Related U.S. Application Data

(60) Provisional application No. 63/109,868, filed on Nov. 4, 2020.

(51) Int. Cl.
| | | |
|---|---|---|
| G06F 16/18 | (2019.01) | |
| G06F 16/182 | (2019.01) | |
| G06F 16/13 | (2019.01) | |

(52) U.S. Cl.
CPC .......... *G06F 16/182* (2019.01); *G06F 16/137* (2019.01)

(58) Field of Classification Search
CPC ...... G06F 16/182; G06F 16/137; G06Q 10/06
USPC ........................................................ 707/827
See application file for complete search history.

(56) References Cited

U.S. PATENT DOCUMENTS

| | | | | |
|---|---|---|---|---|
| 8,799,042 B2* | 8/2014 | Hampapur | ............. | G06Q 10/06 |
| | | | | 705/7.41 |
| 9,202,252 B1* | 12/2015 | Smith | ..................... | G06Q 50/02 |
| 10,126,284 B1* | 11/2018 | Jenkins | ..................... | G09G 5/36 |
| 2005/0182650 A1* | 8/2005 | Maddox, Jr. | ........... | G06Q 10/10 |
| | | | | 705/305 |
| 2011/0173035 A1* | 7/2011 | Isom | ..................... | G06Q 10/103 |
| | | | | 705/317 |
| 2014/0235351 A1* | 8/2014 | Takushima | ............ | A63F 13/358 |
| | | | | 463/42 |
| 2016/0063402 A1* | 3/2016 | Webb | ................... | G06Q 10/063 |
| | | | | 705/348 |
| 2017/0270624 A1* | 9/2017 | Rooney | .................. | G06Q 40/12 |
| 2017/0278004 A1* | 9/2017 | McElhinney | ............ | G06N 5/04 |
| 2017/0322705 A1* | 11/2017 | Conway | .................. | H04L 67/12 |
| 2018/0017710 A1* | 1/2018 | Beck | ........................ | G01W 1/10 |
| 2018/0321356 A1* | 11/2018 | Kulkarni | ............. | H04W 64/003 |

(Continued)

*Primary Examiner* — Hicham Skhoun
(74) *Attorney, Agent, or Firm* — Parsons Behle & Latimer

(57) ABSTRACT

Computer-implemented systems and methods for water asset management are disclosed. The systems include water data services components having computer implemented modules for generating a prompt for a user to input a water asset identification number, retrieving and returning water asset metadata in response to input of a valid water asset identification number, generating a prompt for user validation of the returned water asset metadata, storing validated water asset metadata; communicating the stored and validated water asset metadata to an interplanetary file system (IPFS) for generation of a water asset metadata hash value, and storage of the water asset metadata hash value in a cloud table. The systems also include a cloud big table component comprising modules for storing and updating the cloud table.

10 Claims, 4 Drawing Sheets

(56) References Cited

U.S. PATENT DOCUMENTS

| | | | | |
|---|---|---|---|---|
| 2020/0409929 A1* | 12/2020 | Kodavarti | ............ | G06F 16/2365 |
| 2021/0381207 A1* | 12/2021 | Brotherton | .......... | G01M 3/2807 |
| 2021/0403157 A1* | 12/2021 | Thompson | ........... | G05D 1/0094 |
| 2022/0084013 A1* | 3/2022 | Kulkarni | ................... | H04L 9/50 |
| 2022/0106775 A1* | 4/2022 | Henry | ................... | G01F 15/063 |
| 2022/0215471 A1* | 7/2022 | Simpson | ............ | G06Q 20/4015 |

\* cited by examiner

SYSTEM AND METHOD FOR IDENTIFYING, INVENTORYING, MANAGING, AND MONETIZING WATER ASSETS

CROSS-REFERENCE TO RELATED APPLICATIONS

This application, under 35 U.S.C. § 119, claims the benefit of U.S. Provisional Patent Application Ser. No. 63/109,868 filed on Nov. 4, 2020, and entitled "SYSTEM AND METHOD FOR IDENTIFYING, INVENTORYING, MANAGING, AND MONETIZING WATER ASSETS," the contents of which are hereby incorporated by reference herein.

FIELD OF THE DISCLOSURE

This disclosure relates generally to water asset value augmentation. Specifically, and not by way of any limitation, this disclosure presents a system and method for identifying and inventorying, managing, and monetizing water assets and their accompanying rights.

BACKGROUND

In many parts of the United States, water assets and related rights are conveyed by and between parties in inefficient ways that rely heavily on intermediaries, such as brokers or others playing similar roles. As a result of these and other inefficiencies, parties to sophisticated or complicated water rights transactions generally require the assistance of specialized water counsel and other professionals, with all of the attendant costs and expenses. In many jurisdictions, because the underlying data cannot be readily or efficiently verified, the outcome of a successful water rights transaction may be a transfer via quitclaim deed that has no warranty associated with the water asset.

Other water rights transactions may involve "handshake" deals between counterparties, such as neighbors in farming communities, where one party with water rights may lease some or all of his or her water rights to a counterparty for a fee, nominal or otherwise. Beyond word-of-mouth, a party seeking to obtain water rights may, in certain areas, locate individuals seeking to initiate such transactions in classified listings. In some jurisdictions, a key motivation in consummating a water rights transaction, such as a lease, is to show usage of the water right to insure against escheatment or loss of that right due to non-use. Accordingly, such opaque transactions may further distort already inefficient water markets, to the extent that any exist, given that the determination of the value of the water right is not a primary concern and may take a back seat to what may turn out to be the more pressing concern of proving historical use of the water right at issue.

In order to move forward with a water rights transaction in many jurisdictions, the parties need to access information held in multiple locations. The state, county, municipality and other relevant public district or entity may well hold and maintain distinct information related to the dry or paper right. In jurisdictions where the validity of a water right is tied to its usage, the party seeking to transfer, lease or otherwise monetize the right may maintain information regarding the historical use of the water right. While the information held by public actors tends to be publicly accessible where available, the information held and maintained by private actors tends to be privately held with no incentive for private actors to make it publicly accessible.

At present, water rights transactions largely take place in a system that is, at best, opaque given the diffusion of information thus inviting or necessitating participation from various intermediaries whose roles in transactions are perversely incentivized to drive up more costs and more inefficiencies. In addition to the economic costs of inefficient water markets (inflated or deflated pricing of such assets, for example), these opaque water rights transactions are a leading source of water rights conflicts due to the lack of trusted, verifiable sources of information.

Other drawbacks, issues, inconveniences, and inefficiencies are also present in existing systems and methods.

SUMMARY

Accordingly, the herein disclosed embodiments address the above, and other, drawbacks, issues, inconveniences, and inefficiencies in existing systems and methods.

Disclosed embodiments include a system and method that enables the inventorying, management and monetization of water assets. The system includes two or more computer-implemented modules, namely, (a) a water asset inventory and management subsystem, and (b) a water asset monetization subsystem.

The water asset inventory and management module integrates with water data services and enables the user to retrieve, manage and store water asset-related data. This module also enables the user to generate a water-rights token and to transfer such a token to be held in the user's digital wallet.

The water asset monetization module integrates with water data services and equipment and enables the user to query water asset details (like historical flow and use), to generate appropriate transaction forms, to generate and approve transaction requests, to submit changes for approval by state authorities, to update and store data, and to update and transfer the water token to the user's digital wallet. By aggregating such data and linking it to a digital token associated with the underlying water rights, parties to a water-rights transaction can quickly, cheaply, and verifiably exchange information regarding the water rights at issue and even transact the water rights digitally with a minimum of intermediaries and transactional friction.

The herein disclosed embodiments present improvements to the current art in several ways, noted here without limitation. First, they enable the accurate inventorying and management of water assets, thereby taking away the incentives in the current processes that result in waste of water assets. Second, the disclosed embodiments enable the storage and maintenance of water asset-related data in a centralized, accessible and immutable data store—such as a distributed ledger—allowing parties to a transaction to efficiently access the same reliable data, thereby reducing transaction costs and disputes in the existing systems related to gathering and reconciling transaction data. Third, the disclosed embodiments enable the tokenization of water assets thus enabling or streamlining means of monetization of such assets. Put another way, the disclosed embodiments enable frictionless transfer by and between water rights holders and purchasers through programmable contracts.

Other embodiments, advantages, and features are also disclosed.

Figure 1:
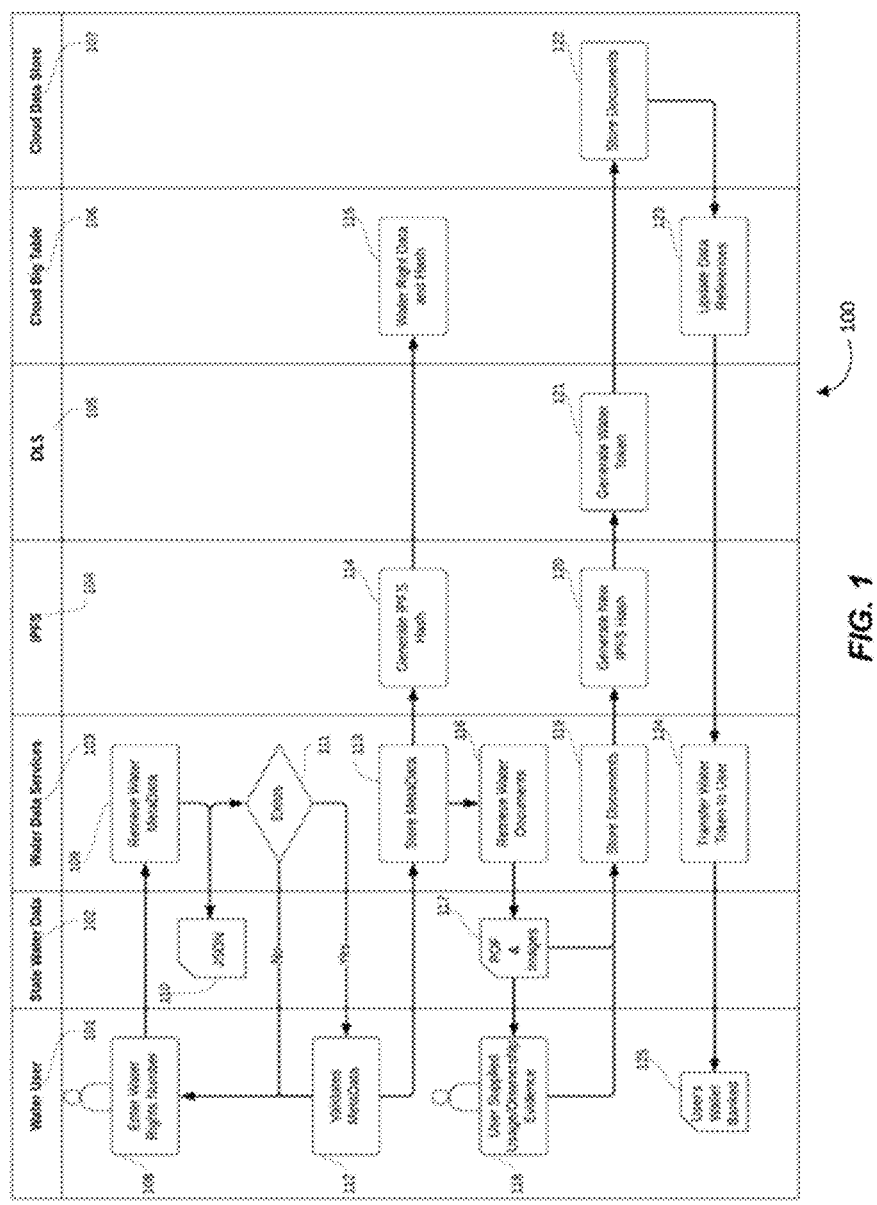
FIG. 1 illustrates an example of a water asset inventory and management process in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

In one embodiment, a system is enabled, without limitation, by the following computer-implemented modules or components that are listed in no particular order: (a) a water asset inventory and management module, and (b) a water asset monetization module. In alternative embodiments, the water asset inventory and management module may comprise separate or distinct water asset inventory and water asset management modules.

Inventory and Management.

As illustrated in FIG. 1, the water asset inventory and management module 100 enables a water user 101 to account for and manage water assets utilizing a number of components that include, without limitation, state water data 102, water data services 103, an interplanetary file system 104, a peer-to-peer blockchain or distributed ledger system 105 token 121 (e.g., Raven Coin token), a cloud big table 106, and cloud data store 107.

In order to inventory and manage the water asset at issue, the water user 101 accesses the water asset inventory and management module 100 which may be a computer-implemented functionality integrated into a mobile computing application that also enables other functionalities beyond inventorying and management of water assets, or it may be stand-alone mobile computing application solely dedicated to the inventorying and management of water assets. In an alternative embodiment, the module 100 may be in the form of a web-based computing application. Other embodiments are also possible.

Figure 3:
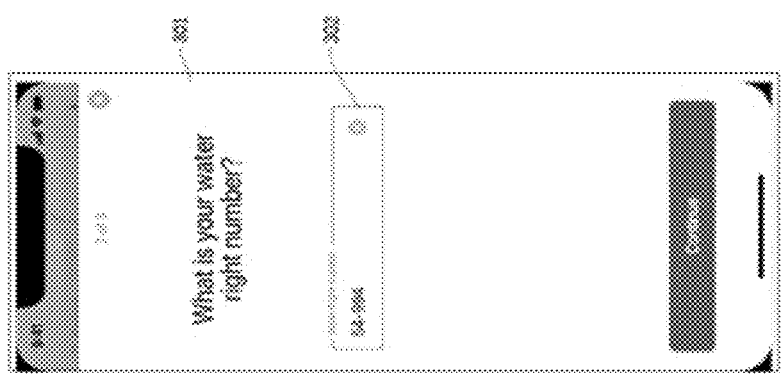
FIG. 3 illustrates an example of the entry of a water rights number into a mobile computing device such as a smartphone in accordance with disclosed embodiments.

The water user 101 is prompted at 108 by the module 100 to input a water rights number. As further illustrated in FIG. 3, the water user 101 may input the water rights number 302 into a mobile computing device such as a smartphone 301, or the like. Once the water user 101 successfully enters the water rights number 302, the module 100 places a computer-implemented request to the water data services 103 component with a request to retrieve water asset metadata 109 that corresponds to the water rights number 302 entered. A successful request to the to the water data services 103 component returns water asset metadata 110 in a suitable data storage and transportation format such as, without limitation, the JavaScript Objection Notation (JSON) format or other computer-readable format. To the extent that there is no water asset metadata 110 returned as a result of the query 109, the module 100 reverts at 111 back to the start of the process where the water user 101 is once again prompted to enter a water rights number 108. On the other hand, in the situation whereby water asset metadata 110 is returned as a result of the query 109, the module 100 then presents that metadata 110 to the water user 101 and prompts 112 the user 101 to validate the metadata.

After the water asset metadata is successfully validated at 112, the module 100 then stores the validated metadata at 113 in the water data services component 103, after which the module integrates with an interplanetary file system (IPFS) 104 to generate a hash at 114 of the validated metadata. The module 100 then stores at 115 the validated metadata and IPFS hash 115 in a cloud table 106.

Concurrent with or subsequent to the generation of the IPFS hash at 114 and storage at 115 of the validated metadata and IPFS hash in the cloud table 106, the module 100 retrieves pertinent water documents at 116 as part of the water data services component 103. The water documents may be embodied in various forms such as, without limitation, PDFs or images 117. The module 100 then prompts the user 101 to supplement the information in documents 117 with any user-supplied data 118 relating to, without limitation, usage of the water asset or any other data gathered by the user 101 pertaining to ownership of any actionable rights to the water asset in question.

The supplemental data 118 and the documents 117 are stored at 119 in the water data services component 103 after which the module 100 integrates with the IPFS 104 where a new IPFS hash is generated at 120. The module 100 then integrates with a distributed ledger system (DLS) 105, such as Raven Coin, to facilitate the generation of water token 121 based, in whole or in part, on the IPFS has previously generated 120.

Figure 4:
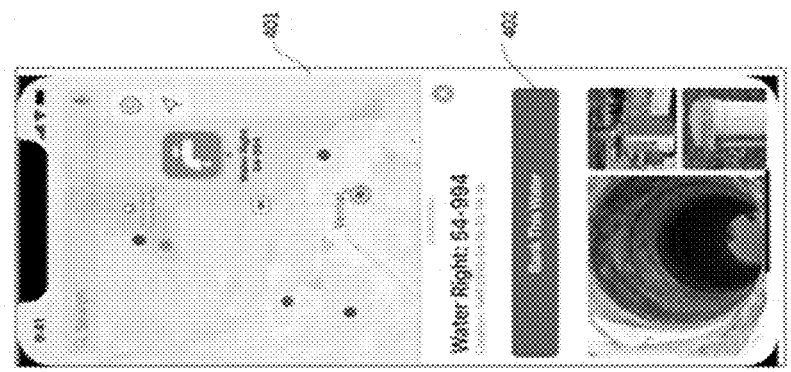
FIG. 4 illustrates an example of the banking of a water right using a mobile computing device such as a smartphone in accordance with disclosed embodiments.

Following the generation of the water token 121, the module 100 integrates with a cloud data store 107 and stores at 122 the supplemental data 118 and the documents 117 in that cloud data store 107. After a successful document storage 122, the module 100 then calls up the cloud table 106 and requests that the validated metadata and IPFS hash 115 be updated at 123 with any new corresponding IPFS hash data (e.g., from new IPFS hash 120). Following the update at 123, the module 100 uses the water data services component 103 to transfer at 124 the water token 121 to the water user 101, after which the user's token wallet is banked in user's 101 water token wallet or bank 125. As further illustrated in FIG. 4, the water user may bank the water right 402 using a mobile computing device such as a smartphone 401.

The water token bank 125 referred to above may a combination of one or more of a water cooperative, virtual bank and/or trading floor for water products (such as smart contract water leases, buy/sell agreements, futures contracts on water storage and/or use of snow making rights, using water rights as collateral for monetary loans e.g. "the hypothecation of water"). Water banks 125, 224 may be regulated under various regulatory regimes.

The water banks 125, 224 disclosed here may comprise the cooperative, banking and trading floor technology ("rails") upon which water banks 125 and markets function. These water banks comprise the technology that facilitates activities of the water bank itself (e.g., depositing water rights into the bank in exchange for membership rights in the bank, granting the depositor a use license of the technology solution and water product tools (e.g., smart water leases, smart water contracts, communication and voting tools for the members). The water banks 125, 224 may be formed geographically for the purpose of interoperability and coordination of water products and "wet" water in a geographic area. The water banks 125, 224 may have "interlocking" agreements with other water banks or trading floors that will enable an interlocking and international trading of "wet" water, water rights and water products.

Figure 6:
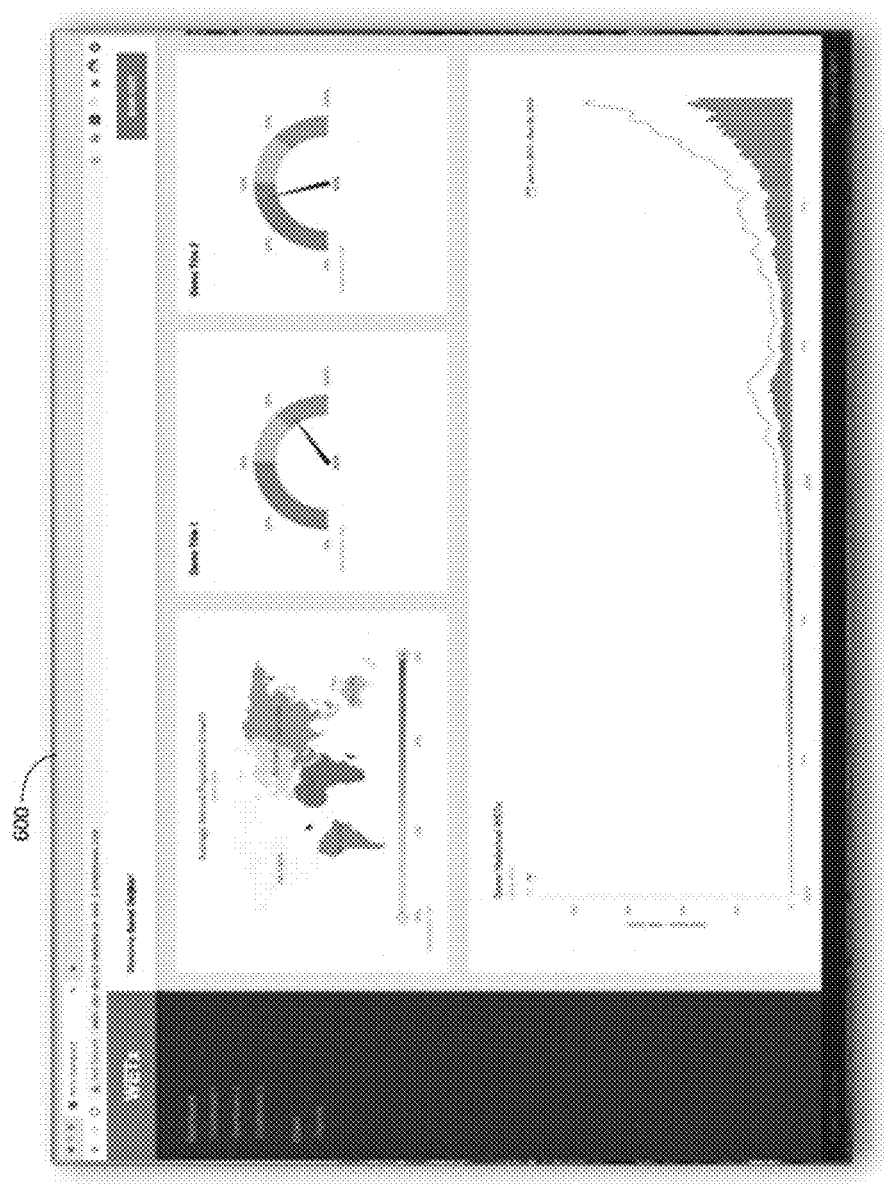
FIG. 6 illustrates an example of a dashboard showing the intersection legal rights to water assets and actual use of such assets in accordance with disclosed embodiments.

As illustrated schematically in FIG. 6, a dashboard 600 enables business intelligence functionality that visualizes, graphically, the intersection of an owner's legal rights to use the water (historically found in legal documents like deeds, shares of irrigation companies, and contracts to use/put to use leases, etc.) and the actual use of the water as measured by telemetry. The dashboard 600 securely ties to cloud and IOT infrastructure to facilitate management of the "wet" water and the water assets under management by the customer/user 101. The referenced cloud infrastructure may comprise a database hosted in the cloud where data related to ownership and use of water products like water rights, use licenses, physical water storage, and the like, are stored. The cloud may also be rooted in distributed ledger technology to increase the trustworthy and transparent aspects of inventory and management of the resource.

Monetization.

Figure 2:
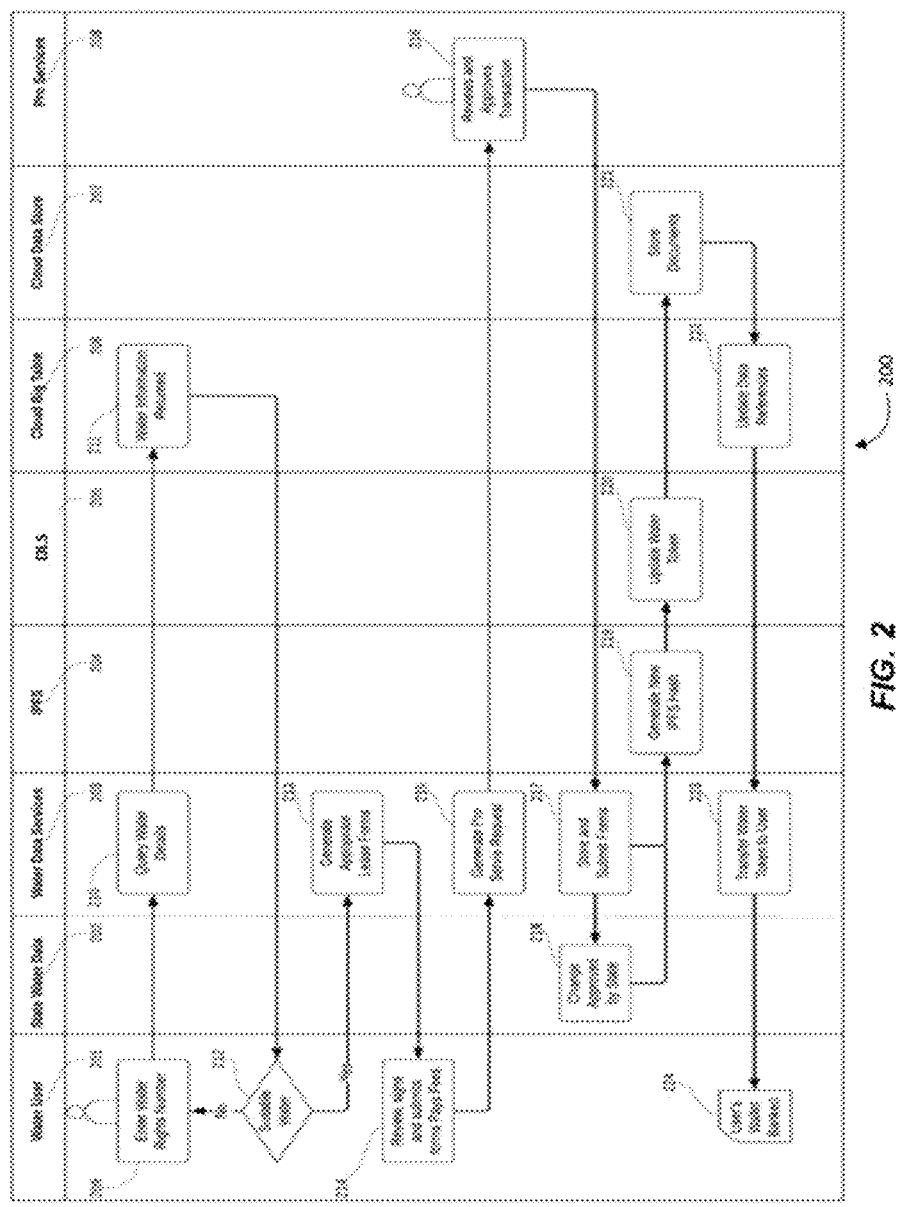
FIG. 2 illustrates an example of a water asset monetization process, in the form of a water lease in accordance with disclosed embodiments.

As illustrated in FIG. 2, a water asset monetization module 200 enables a water user 201 to, among other things, monetize water assets utilizing a number of components that include, without limitation, state water data 202, water data services 203, an interplanetary file system 204, a peer-to-peer blockchain or distributed ledger system 205 token 121 (e.g., Raven Coin token), a cloud big table 206, cloud data store 207, and a Pro Services component 208. In an embodiment, water asset monetization module 200 relies upon tokens 121 that are generated and data that are gathered, processed and stored as part of the water asset inventory and management module 121. The token 121 referenced here may be an asset backed token, with the asset backing the token 121 being water assets.

The exemplary process illustrated in FIG. 2 is a water asset lease transaction and is described here for illustrative purposes only and not by way of limiting the nature and scope of transactions and process that are enabled by the disclosed embodiments. Other water asset transactions that are enabled by this invention include, without limitation, sale or purchase of water rights, and collateralization or securitization of water assets, among other transactions.

As shown in FIG. 2, the water user 201 accesses the water asset monetization module 200 which may be a functionality integrated into a mobile computing application that also enables other functionalities beyond inventorying and management of water assets, or it may be stand-alone mobile computing application solely dedicated to the inventorying and management of water assets. In an alternative embodiment, the module may be in the form of a web-based computing application.

In this embodiment, the water user 201 is prompted by the module 200 to input at 209 a water rights number. Once the water user 201 successfully enters the water rights number, the module 200 calls the water data services component 203 with a request to query water details at 210 from the cloud table 206. A successful response by the cloud table 206 to the query returns water information 211. The module 200 then prompts the water user 201 to confirm at 212 whether the water asset is suitable for the intended purposes. If, as indicated at 212, the water asset is not suitable, the module prompts the water user 201 to enter a new or different water rights number as a means of querying water details. If, as indicated at 212, the water user 201 determines that the water asset is suitable, the module 200 prompts the water data services component 203 to generate appropriate least forms 213. Once the appropriate lease forms are generated at 213, the water user 201 is prompted to review, sign and submit the forms along with making any necessary fee payments as indicated at 214. The module 200 thereafter prompts the water data services component 203 to generate Pro Services Request at 215. The Pro Services component 208 then facilitates the review of the transaction and approves the transaction as appropriate at 216. Once the transaction is approved, the water data services component 203 stores and submits the pertinent forms 217 for any changes to be approved at 218 by the relevant state or local government agency as part of the state water data services component 202.

Figure 5:
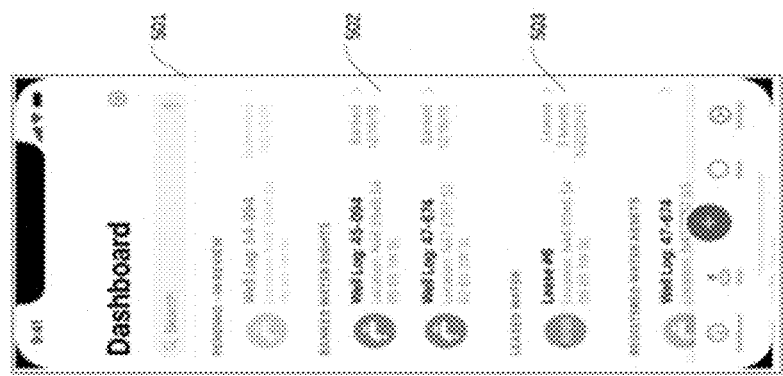
FIG. 5 illustrates an example of a dashboard on a mobile computing device such as a smartphone showing leased and banked water assets in accordance with disclosed embodiments.

Following approval by the relevant state or local government agency, the module 200 integrates with the IPFS 204 and prompts it to generate a new IPFS hash 219 based on the forms stored 217 in the water data services component 203. The module thereafter prompts the DLS 205 to update the previously generated water token 220 after which the module 200 prompts the cloud data store 207 to store the relevant documents at 221. The module 200 then enables the updating of relevant data references at 222 as part of the cloud table 206. With the data references update, the water token is then transferred 223 to the user 201 as part of the water data services component 203, after which the user's wallet is banked at 224. As further illustrated in FIG. 5, the water user access information regarding banked water assets 502 and leased water assets 503 using a mobile computing device such as a smartphone 501.

Although various embodiments have been shown and described, the present disclosure is not so limited and will be understood to include all such modifications and variations are would be apparent to one skilled in the art.

What is claimed is:

1. A computer-implemented system for water asset management, wherein the water assets comprise water rights, the system comprising:
at least one processor and a computer readable storage medium, wherein the at least one processor is structured, located, connected, and/or programmed to run program instructions stored on the computer readable storage medium; and the program instructions which, when executed by the at least one processor, cause the at least one processor to provide a water data services component further comprising program instructions which, when executed by the at least one processor:
generate a prompt for a user to input a water asset identification number;
retrieve and return water asset metadata, wherein the water asset metadata includes, but is not limited to, historical flow and use data, in response to input of a valid water asset identification number received at the prompt for a user to input a water asset identification number;
generate a prompt for user validation of the returned water asset metadata;
store validated water asset metadata in the computer readable storage medium;
communicate the stored and validated water asset metadata to an interplanetary file system (IPFS) that includes program instructions for generation of a water asset metadata hash value; and communicates the water asset metadata hash value to at least one server that includes a computer readable storage medium that stores the water asset metadata hash value in a cloud table; and includes program instructions which, when executed by at least one processor in the at least one server, communicate with a cloud big table component comprising modules program instructions for storing and updating the cloud table.

2. The computer-implemented system for water asset management of claim 1 wherein the water data services component further comprises:

program instructions for a document retrieval module that enables a user to input electronic documents or images related to a water asset associated with the water asset identification number into the computer readable storage medium, and retrieve the electronic documents or images related to a water asset associated with the water asset identification number.

3. The computer-implemented system for water asset management of claim 2 wherein the water data services component further comprises:

program instructions for communicating stored electronic documents or images related to a water asset to the IPFS and program instructions for generating an updated water asset metadata hash value.

4. The computer-implemented system for water asset management of claim 3 further comprising:

program instructions for enabling the at least one processor to communicate with a distributed ledger system (DLS), that is in communication with the IPFS, the DLS for generating a water token based, at least in part, on the updated water asset metadata hash value.

5. The computer-implemented system for water asset management of claim 3 further comprising:

program instructions for enabling the at least one processor to communicate with a cloud data store component that further comprises program instructions for storing electronic documents or images related to a water asset in a cloud data store.

6. The computer-implemented system for water asset management of claim 4 wherein the water data services component further comprises:

program instructions for enabling the at least one processor to communicate with a transfer module that transfers the water token to a user's wallet bank.

7. A computer-implemented system for water asset management, wherein the water assets comprise water rights, the system comprising:

at least one processor and a computer readable storage medium, wherein the at least one processor is structured, located, connected, and/or programmed to run program instructions stored on the computer readable storage medium; and the program instructions which, when executed by the at least one processor, cause the at least one processor to provide a cloud table component for storing water asset information; and a water asset module further comprising program instructions for:

providing an electronically displayed prompt that prompts a user to input a water asset identification code;

providing a water asset query module that communicates electronically with the cloud table component to retrieve and electronically display, in response to the input water asset identification code, stored water asset information, wherein the water asset information includes, but is not limited to, historical flow and use data, associated with the water asset identification code;

providing an, electronically displayed, water asset intended use prompt that prompts the user to input an intended use for the water asset associated with the water asset identification code;

providing a form generation module that, in response to a valid intended use input, generates electronic forms associated with the valid intended use input at the intended use prompt for the water asset;

providing a form submission module that electronically communicates electronic forms generated by the form generation module to the user and receives completed electronic forms submitted by the user;

providing a pro services module that generates an electronic request for review and approval of the completed electronic forms submitted by the user; and providing an approved form module that electronically stores approved electronic forms; and communication with an interplanetary file system (IPFS) in order to communicate information related to the stored, approved, electronic forms to an IPFS for generation of a water asset metadata hash value.

8. The computer-implemented system for water asset management of claim 7 further comprising:

program instructions for enabling the at least one processor to communicate with a distributed ledger system (DLS), that is in communication with the IPFS, and the DLS is for generating a water token based, at least in part, on the water asset metadata hash value.

9. The computer-implemented system for water asset management of claim 8 further comprising:

program instructions for enabling the at least one processor to communicate with a cloud data store component further comprising program instructions for storing approved electronic forms related to the water asset in a cloud data store.

10. The computer-implemented system for water asset management of claim 8 wherein the water data services component further comprises:

program instructions for enabling the at least one processor to communicate with a transfer module that includes program instructions to transfer the water token to a user's wallet bank.

* * * * *